United States Patent
Tian et al.

(10) Patent No.: US 12,370,032 B2
(45) Date of Patent: Jul. 29, 2025

(54) ORAL CARE DEVICE AND CONTROL METHOD THEREOF

(71) Applicant: GUANGZHOU STARS PULSE CO., LTD., Guangdong (CN)

(72) Inventors: Haozhe Tian, Guangdong (CN); Jili Yang, Guangdong (CN); Yu Zou, Guangdong (CN)

(73) Assignee: GUANGZHOU STARS PULSE CO., LTD., Guangzhou (CN)

( * ) Notice: Subject to any disclaimer, the term of this patent is extended or adjusted under 35 U.S.C. 154(b) by 0 days.

(21) Appl. No.: 18/938,493

(22) Filed: Nov. 6, 2024

(65) Prior Publication Data
US 2025/0161013 A1    May 22, 2025

Related U.S. Application Data

(63) Continuation of application No. PCT/CN2024/107730, filed on Jul. 26, 2024.

(30) Foreign Application Priority Data

Nov. 16, 2023   (CN) .......................... 202311531047.6

(51) Int. Cl.
*A61C 17/34*        (2006.01)
*A61C 17/22*        (2006.01)

(52) U.S. Cl.
CPC ............ *A61C 17/34* (2013.01); *A61C 17/221* (2013.01)

(58) Field of Classification Search
CPC ............ A46B 15/0002; A46B 15/0012; A46B 2200/1066; A61C 17/34; A61C 17/3463; A61C 17/221; A61C 17/3445
See application file for complete search history.

(56) References Cited

U.S. PATENT DOCUMENTS 8,172,574 B2 * 5/2012 Hilfinger ............... A61C 17/221
                                                         15/167.1
9,204,947 B2 * 12/2015 Bovenkamp ......... A61C 17/221
(Continued)

FOREIGN PATENT DOCUMENTS

CN          105979908 A      9/2016
CN          108903982 A      11/2018
(Continued)

OTHER PUBLICATIONS

English translation for CN 115085601 A (Year: 2022).*
(Continued)

*Primary Examiner* — An H Do
(74) *Attorney, Agent, or Firm* — Daniel M. Cohn (57) ABSTRACT

An oral care device and a control method thereof are provided. The control method includes obtaining an oral care instruction; determining a first driving signal and a second driving signal corresponding to the oral care instruction in response to the oral care instruction, controlling a care component to generate a first motion based on the first driving signal, and controlling the care component to generate a second motion based on the second driving signal; and alternately outputting the first driving signal and the second driving signal to control the care component to alternately output the first motion and the second motion. A motion path of the first motion is different from a motion path of the second motion. The oral care device is able to apply forces to remove tartar or dental plaque on tooth surface in different directions.

15 Claims, 7 Drawing Sheets

(56) References Cited

U.S. PATENT DOCUMENTS

| | | |
|---|---|---|
| 11,246,403 B2* | 2/2022 | May .................. A46B 15/0008 |
| 11,361,672 B2* | 6/2022 | Gatzemeyer ........... A46B 15/00 |
| 2022/0061973 A1 | 3/2022 | Farrell |

FOREIGN PATENT DOCUMENTS

| | | |
|---|---|---|
| CN | 208989214 U | 6/2019 |
| CN | 111568584 A | 8/2020 |
| CN | 115085601 A | 9/2022 |
| CN | 115105237 A | 9/2022 |
| CN | 115844571 A | 3/2023 |
| CN | 117357292 A | 1/2024 |
| WO | 2023088721 A1 | 5/2023 |

OTHER PUBLICATIONS

CNIPA, First Office Action issued for Chinese Application No. 202311531047.6, mailed Feb. 27, 2024 (11 pages).
Notification to Grant Patent Right for Invention, Chinese Application No. 202311531047.6, mailed Apr. 19, 2024 (3 pages).
International Search Report issued in corresponding International application No. PCT/CN2024/107730, mailed Oct. 5, 2024.
Written Opinion of the International Search Authority in corresponding International application No. PCT/CN2024/107730, mailed Oct. 5, 2024.

* cited by examiner

ORAL CARE DEVICE AND CONTROL METHOD THEREOF

TECHNICAL FIELD

The present disclosure relates to a technical field of oral care, and in particular to an oral care device and a control method thereof.

BACKGROUND

In the related art, electric toothbrushes generally clean teeth by high-frequency vibration or by rotating brush heads thereof, so as to scrape tooth surfaces, thereby removing dental plaque and tartar. When users use their electric toothbrushes, the users commonly move a brush head across their teeth.

However, due to relatively monotonous motion modes of the electric toothbrushes in the related art, a cleaning effect of the electric toothbrushes on the teeth is not satisfactory, especially at areas such as a gum line, dead corners, pits, and fissures.

SUMMARY

The present disclosure provides an oral care device and a control method thereof. By controlling the care component to alternately performs a first motion and a second motion with different motion paths, forces in different directions are applied to remove tartar or dental plaque on tooth surfaces, thereby providing a better oral care effect.

In a first aspect, the present disclosure provides the control method of the oral care device. The control method comprises steps:
  obtaining an oral care instruction;
  determining a first driving signal and a second driving signal corresponding to the oral care instruction in response to the oral care instruction, controlling a care component to generate a first motion based on the first driving signal, and controlling the care component to generate a second motion based on the second driving signal; and
  alternately outputting the first driving signal and the second driving signal to control the care component to alternately output the first motion and the second motion.

A motion path of the first motion is different from a motion path of the second motion.

The step of alternately outputting the first driving signal and the second driving signal comprises:
  outputting the first driving signal for a first duration;
  suspending output of the first driving signal, and outputting the second driving signal for a second duration; and
  suspending output of the second driving signal, and outputting the first driving signal again for the first duration.

The first duration is not less than the second duration, and/or the first duration and the second duration are greater than a predetermined duration.

The oral care device comprises a bidirectional motor and the care component, the control method is applied to the bidirectional motor, and the bidirectional motor drives the care component to move.

In a second aspect, the present disclosure provide the oral care device. The oral care device comprises a memory and a processor. The memory is connected to the processor, and the memory is configured to store executable program code.

The processor runs a program corresponding to the executable program code by reading the executable program code stored in the memory, so as to execute the control method mentioned above.

In a third aspect, A control method of an oral care device, comprising steps:
  obtaining an oral care instruction;
  determining a first driving signal and a second driving signal corresponding to the oral care instruction in response to the oral care instruction, controlling a care component to generate a first motion based on the first driving signal, and controlling the care component to generate a second motion based on the second driving signal; and
  alternately outputting the first driving signal and the second driving signal to control the care component to alternately output the first motion and the second motion.

A motion path of the first motion is different from a motion path of the second motion. The first driving signal is different from the second driving signal.

In embodiments of the present disclosure, the oral care instruction is obtained, then the first driving signal and the second driving signal corresponding to the oral care instruction are determined in response to the oral care instruction, the care component is controlled to generate the first motion based on the first driving signal, and the care component is further controlled to generate the second motion based on the second driving signal, and the first driving signal and the second driving signal are alternately output to control the care component to alternately output the first motion and the second motion. By controlling the care component to alternately perform the first motion and the second motion with different motion paths, the forces in different directions are applied to remove the tartar or the dental plaque on the tooth surfaces, thereby providing a better oral care effect.

The above description is only an overview of technical solutions of the present disclosure. In order to more clearly understand technical means of the present disclosure, the present disclosure is implemented in accordance with contents of the specification. In order to make the above and other purposes, features, and characteristics of the present disclosure more obvious and easy to understand, the specific implementation methods of the present disclosure are listed below.

BRIEF DESCRIPTION OF DRAWINGS

In order to more clearly illustrate technical solutions in the embodiments of the present disclosure, the accompany drawings in the embodiments are briefly illustrated below.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments.

Terms "first", "second", "third", and the like in the specification and claims of the present disclosure and the accompanying drawings are used to distinguish different objects, and are not used to describe a specific order. In addition, terms "comprise", "include", and any variations thereof are intended to cover non-exclusive inclusion, e.g., includes a series of steps or units, processes, methods, systems, products, or devices, which are not limited to the listed steps or units, but may optionally further include steps or units not listed, or optionally further includes steps or units inherent to the processes, methods, products, or devices.

Figure 1:
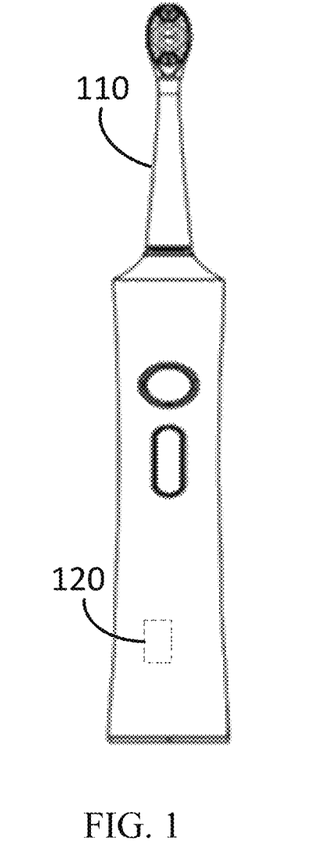
FIG. 1 is a structural schematic diagram of an oral care device according to one embodiment of the present disclosure.

In one embodiment, the present disclosure provides an oral care device. The oral care device is a device capable of performing oral care, such as, but not limited to an electric toothbrush, a dental cleaning instrument, etc. The following embodiments takes an example that the oral care device is the electric toothbrush for illustration. FIG. 1 is a structural schematic diagram of the oral care device according to one embodiment of the present disclosure. As shown in FIG. 1, the oral care device comprises a care component 110 and a control unit 120.

The care component 110 is swingable or movable with a certain amplitude based on a control of the control unit 120 or a manual operation of a user, so as to decompose toothpaste on the care component 110 into fine foam to deeply clean the teeth.

The control unit 120 is disposed in an accommodating cavity of a handle housing and may be a microcontroller unit (MCU). The MCU is also known as a single-chip microcomputer or a single chip. The MCU appropriately reduces a frequency and specifications of a central process unit (CPU), and integrates peripheral interfaces such as memory, counter, USB, A/D conversion, universal asynchronous receiver/transmitter (UART), programmable logic controller (PLC), data memory access (DMA), and even liquid crystal display (LCD) drive circuits on a single chip to form a chip-level computer, which performs different combination controls for different application scenarios.

After obtaining an oral care instruction, the control unit 120 determines a first driving signal and a second driving signal corresponding to the oral care instruction in response to the oral care instruction. The control unit 120 controls the care component to generate a first motion based on the first driving signal and controls the care component to generate a second motion based on the second driving signal. A motion path of the first motion is different from a motion path of the second motion, and the first driving signal and the second driving signal are alternately generated. By controlling the care component to alternately perform the first motion and the second motion with different motion paths, the forces in different directions are applied to remove the tartar or the dental plaque on the tooth surfaces, thereby providing a better oral care effect.

Optionally, the oral care device further comprises one or more indicator lights, a button, a display screen, a speaker, a motor, etc., which are not limited thereto.

Figure 2:
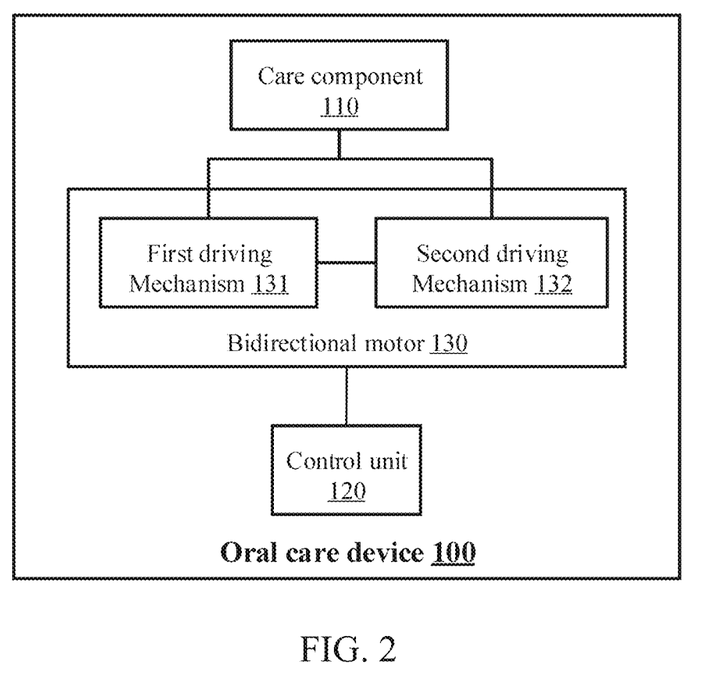
FIG. 2 is a circuit diagram of the oral care device according to one embodiment of the present disclosure.

In some optional embodiments, as shown in FIG. 2, the oral care device comprises a bidirectional motor 130. The control unit 120 of the oral care device controls the care component 110 to move through the bidirectional motor 130. The bidirectional motor 130 comprises a first driving mechanism 131 and a second driving mechanism 132. The first driving mechanism 131 and the second driving mechanism 132 are connected to the care component 110. The first driving mechanism 131 is configured to drive the care component 110 to generate a first motion based on the first driving signal. The second driving mechanism 132 is configured to drive the care component 110 to generate the second motion based on the second driving signal.

Optionally, the control unit 120 controls the first driving signal to be output to the first driving mechanism 131 of the bidirectional motor 130, and controls the second driving signal to be output to the second driving mechanism 132 of the bidirectional motor 130. The first driving signal and the second driving signal are alternately output, so the first driving mechanism and the second driving mechanism alternately work to drive the care component 110 to alternately generate the first motion and the second motion.

Optionally, the control unit 120 controls the first driving signal to transmit to the first driving mechanism 131 of the bidirectional motor 130, and controls the second driving signal to transmit to the second driving mechanism 132 of the bidirectional motor 130. The first driving signal and the second driving signal are simultaneously output, so that the first driving mechanism 131 and the second driving mechanism 132 simultaneously work to drive the care component 110 to generate a combined motion. A motion path of the combined motion is a curve, so that by driving the care component 110 to generate a curved motion (such as an arc motion). Therefore, the care component smoothly scrapes tooth surfaces or positions where the tooth surfaces meets the gums during the oral care process. The curved motion of the care component has a better protective effect on the gums of the user and is not easy to injure the gums compared with a straight motion.

Figure 3:
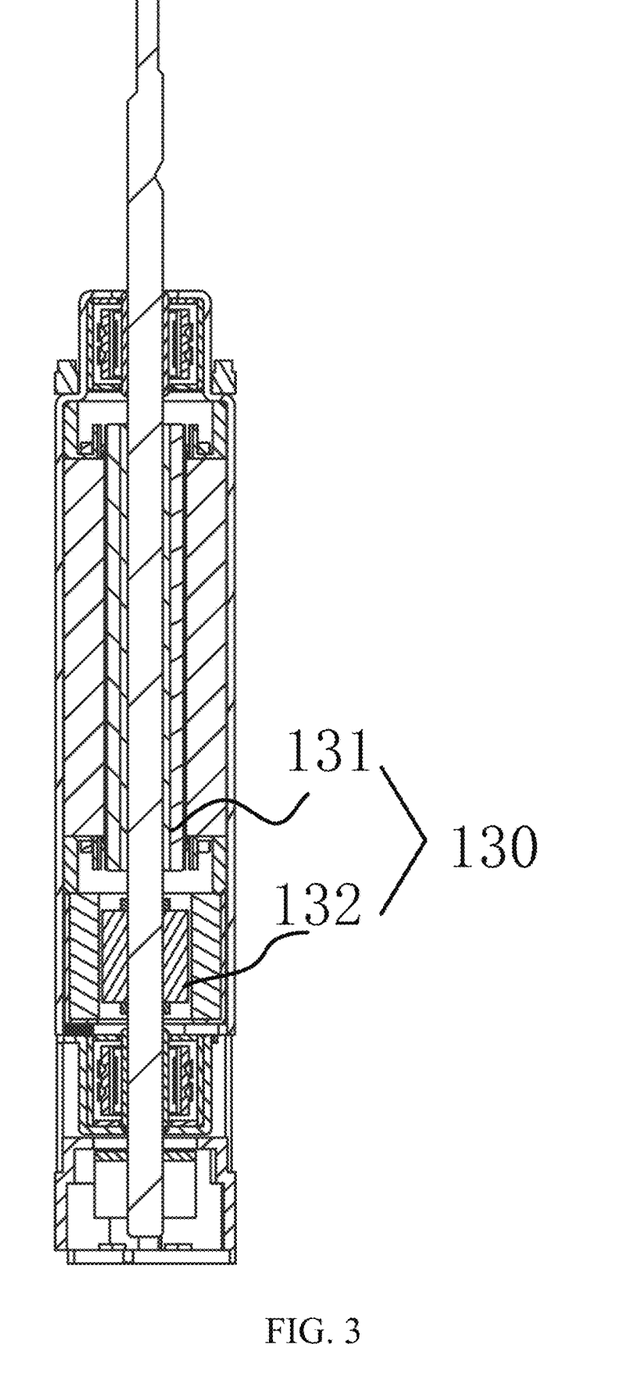
FIG. 3 is a cross-sectional schematic diagram of the oral care device according to one embodiment of the present disclosure.
Figure 4:
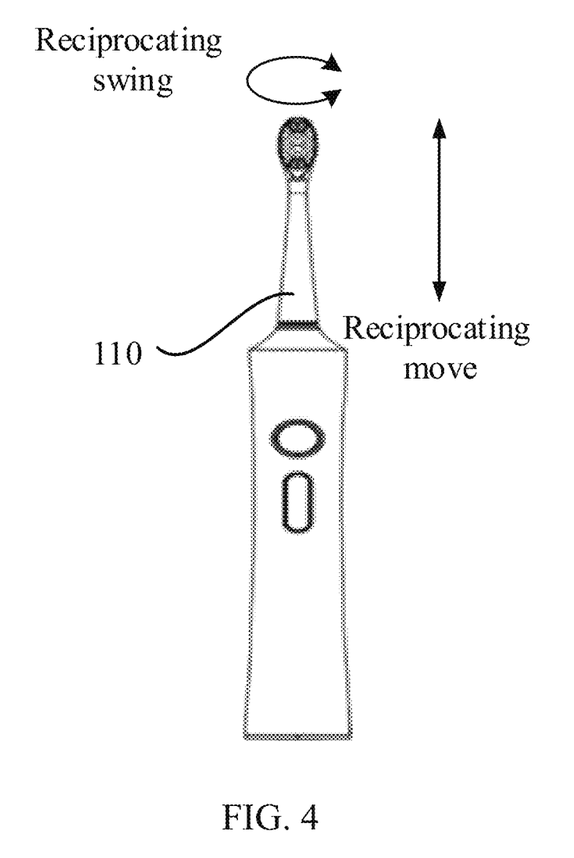
FIG. 4 is a schematic diagram showing motion directions of a first motion and a second motion of the oral care device according to one embodiment of the present disclosure.

Optionally, as shown in FIG. 3, the first driving mechanism 131 is configured to drive the care component 110 based on the first driving signal to perform reciprocating swing with a length extension direction of the care component as a swing axis. That is, the care component 110 swings in a reciprocating manner with the length extension direction as the swing axis, and a winging range thereof is ±1°, ±2°, ±3°, ±5°, ±8°, or ±10°. The second driving mechanism 132 is configured to drive the care component 110 based on the second driving signal to perform a reciprocating motion along the length extension direction of the care component 110. The length extension direction of the care component 110 is roughly same as a length extension direction of a motor shaft and the length extension direction of a handle of the electric toothbrush.

Figure 5:
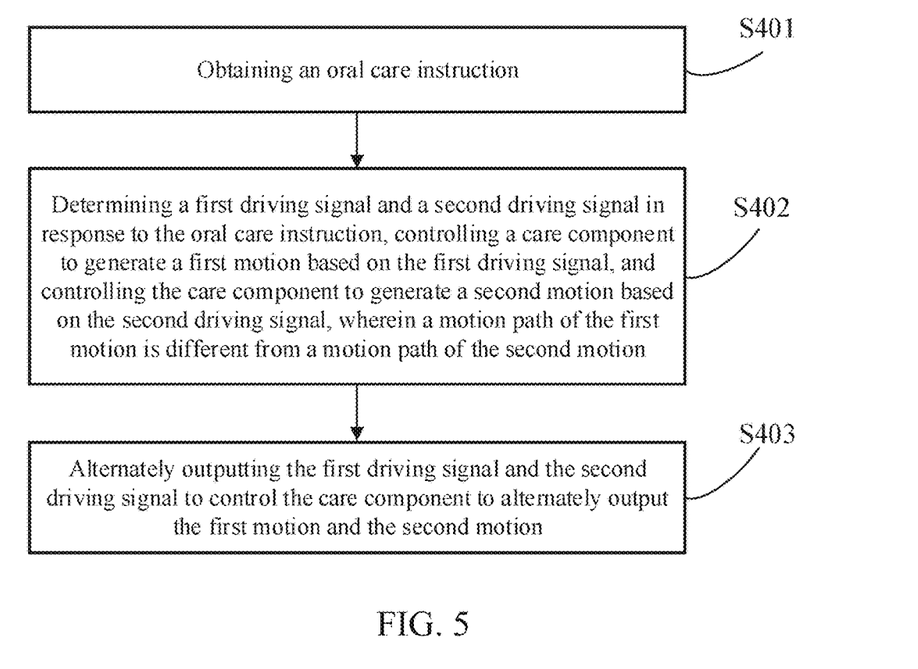
FIG. 5 is a flow chart of a control method of the oral care device according to one embodiment of the present disclosure.

As shown in FIG. 1, the present disclosure takes an example that a control method of the oral care device is applied to the electric toothbrush for further illustration. FIG. 5 is a flow chart of the control method of the oral care device according to one embodiment of the present disclosure. As shown in FIG. 5, the control method of the oral care device comprises steps S401-S403.

The step S401 comprises obtaining the oral care instruction.

Specifically, when the user wants to use the oral care device for oral care, the user is able to trigger the oral care device to generate the oral care instructions through the button or the display screens on the oral care device, which is not limited thereto. Alternatively, or the oral care instruction is sent to the oral care device through a terminal wirelessly connected to the oral care device.

The step S402 comprises determining the first driving signal and the second driving signal corresponding to the oral care instruction in response to the oral care instruction, controlling the care component 110 to generate the first motion based on the first driving signal, and controlling the care component 110 to generate the second motion based on the second driving signal, where the motion path of the first motion is different from the motion path of the second motion.

Optionally, the oral care instruction carries oral care parameters used after the oral care device is operated. The oral care parameters at least comprise one of oral care modes, one of oral care intensity gears, etc. The oral care device may pre-store corresponding relationships between each of oral care parameters, the first driving signal, and the second driving signal. After receiving the oral care instruction, the oral care device responds to the oral care instruction and find the first driving signal and the second driving signal corresponding to the oral care instruction from the corresponding relationships according to the oral care parameters carried by the oral care instruction.

It is understood that in different oral care modes, the first driving signal is different from the second driving signal. The first driving signal and the second driving signal are different in frequency and duty ratio, thereby forming different motion frequencies or movement amplitudes. The first driving signal and the second driving signal may further be different in output duration, thereby affecting a scraping time in different directions. Of course, the first driving signal and the second driving signal may further be different in the number of driving mechanisms that are driven by the first driving signal and the second driving signal, thereby affecting the single motion, a combined motion, and further affecting the motion paths thereof. The oral care device with the driving mechanisms may have more care modes to better meet user needs.

The step S403 comprises alternately outputting the first driving signal and the second driving signal to control the care component to alternately output the first motion and the second motion.

In the embodiment of the present disclosure, the oral care instruction is obtained, then the first driving signal and the second driving signal corresponding to the oral care instruction are determined in response to the oral care instruction, the care component 100 is controlled to generate the first motion based on the first driving signal, and the care component 110 is further controlled to generate the second motion based on the second driving signal, and the first driving signal and the second driving signal are alternately output to control the care component 110 to alternately output the first motion and the second motion. By controlling the care component 110 to alternately perform the first motion and the second motion with different motion paths, the forces in different directions are applied to remove the tartar or the dental plaque on the tooth surfaces, thereby providing a better oral care effect.

Optionally, a motion direction of the first motion is different from a motion direction of the second motion. so that by controlling the care component to alternately perform the first motion and the second motion having different motion paths and motion directions, the care component 100 scrapes the tooth surfaces in different directions, thereby providing a better oral care effect.

Furthermore, as shown in FIG. 3, the first motion (i.e., an arc swing) comprises a reciprocating swing with a length extension direction of the care component as the swing axis, and the second motion (i.e., a linear vibration) comprises a reciprocating motion along the length extension direction of the care component. By controlling the care component to repeatedly switch between reciprocating swinging (arc swing) with the length extension direction of the care component as the swing axis and reciprocating moving (linear vibration) along the length extension direction of the care component, the linear vibration replaces a horizontal motion of the oral care device when the user manually uses the oral care device for oral care. Further, combining with high-frequency swing of the care component, an up-and-down vibration of the oral care device during oral care is simulated. A projection of the motion path of the first motion and a projection of the motion path of the second motion on the tooth surfaces are perpendicular to each other, so that the dental plaque is better removed. By controlling mechanical motions of the care component, the user is allowed to better perform oral care and a problem of oral care effects being affected by individual user operation differences is avoided. At the same time, the motions of the care component are consistent with a notion mode of the Bass brushing method. By controlling the care component to move in the above-mentioned manner, the users can directly master the Bass brushing method.

Furthermore, if the swing amplitude of the care component is too large, it may cause certain damage to the gums, but when an extension and contraction amplitude (movement amplitude) of the care component is larger, it does not cause damage to the gums. Therefore, a movement amplitude of the second motion should be greater than a swing amplitude of the first motion, so that while protecting the gums, it also allows the care component to generate a reciprocating motion with a large movement amplitude along the length extension direction, thereby improving oral care efficiency of the user. And/or, the movement frequency of the second motion is less than the swing frequency of the first motion. Therefore, the care component output a reciprocating swing with a large swing frequency with the length extension direction as the swing axis, which efficiently removes plaque in the gingival sulcus at an oral position, thus improving the oral care efficiency of the oral care device.

Optionally, the motion direction of the first motion and the motion direction of the second motion may be the same. However, the first motion and the second motion satisfy at least one of following conditions: a duty ratio of the first driving signal controlling the care component to generate the first motion is different from a duty ratio of the second driving signal controlling the care component to generate the second motion, and the amplitude of the first motion is different from the amplitude of the second motion. As a result, a motion range of the first motion is different from a motion range of the second motion. For example, the first motion and the second motion have different telescopic ranges or different swing ranges (i.e., different rotation angles). By controlling the care component to alternatively output the first motion and the second motion with the same motion direction but different motion ranges, the arc motion is combined when the first motion and the second motion with different motion ranges are alternately switched, thereby further improving the oral care effect of the oral care device.

Optionally, both the first motion and the second motion are reciprocating swing with the length extension direction of the care component as the swing axis. The amplitude of the second motion is greater than the amplitude of the first motion; and/or the duty ratio of the first driving signal is less than the duty ratio of the second driving signal. Namely, the swing amplitude of the first motion is less than the swing amplitude of the second motion. For instance, a rotation angle of the first motion is ±1°, and a rotation angle of the second motion is ±10°. A duration of the first motion is greater than a duration of the second motion. In this way, the dental plaque is stripped from the tooth surfaces by controlling the care component to swing with a small swing amplitude for a longer time (i.e., the care component outputs the first motion). Then, the dental plaque stripped from the tooth surfaces is directly swept away from the tooth surfaces by controlling the care component to swing with a larger swing amplitude (i.e., the care component outputs the second motion). In addition, the control method is suitable for cleaning side surfaces of the teeth. The second motion with the large swing amplitude further provides a certain massage effect on the gums when the care component swings to edges of the gums. During the second motion, the gums are not continuous brushed, but is intermittently brushed, so damage to the gums is avoided. At the same time, by controlling the care component to alternately move with the duration corresponding to the first motion and the second motion, the gums are intermittently scraped, a blood circulation of the gums is promoted, and good gum care is provided.

Figure 6:
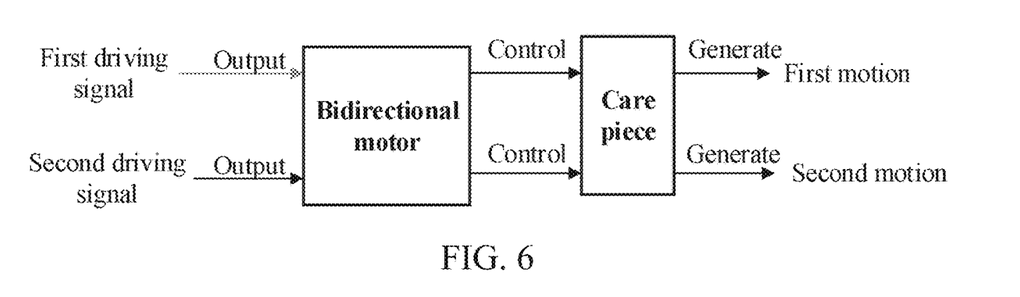
FIG. 6 is a schematic diagram of a control process of the control method of the oral care device according to one embodiment of the present disclosure.

As shown in FIG. 6, the step S402 of controlling the care component to generate the first motion based on the first driving signal and controlling the care component to generate the second motion based on the second driving signal comprises: controlling the bidirectional motor to drive the care component to generate the first motion based on the first driving signal (that is, outputting the first driving signal to the bidirectional motor to drive the bidirectional motor to control the care component to generate the first motion), and controlling the bidirectional motor to drive the care component to generate the second motion based on the second driving signal (that is, outputting the second driving signal to the bidirectional motor to drive the bidirectional motor to control the care component to generate the second motion). so that the care component of the oral care device can be controlled by the bidirectional motor based on the first driving signal and the second driving signal to alternately output vibrations of at least two different paths, so as to ensure that the oral care device can exert a peeling force on the tartar or dental plaque on the tooth surface in multiple directions. Based on the first driving signal and the second driving signal, the bidirectional motor control the care component of the oral care device to alternately output vibrations of at least two different motion paths to ensure that the oral care device apply forces in different directions to remove the tartar or the dental plaque on the tooth surfaces.

Figure 7:
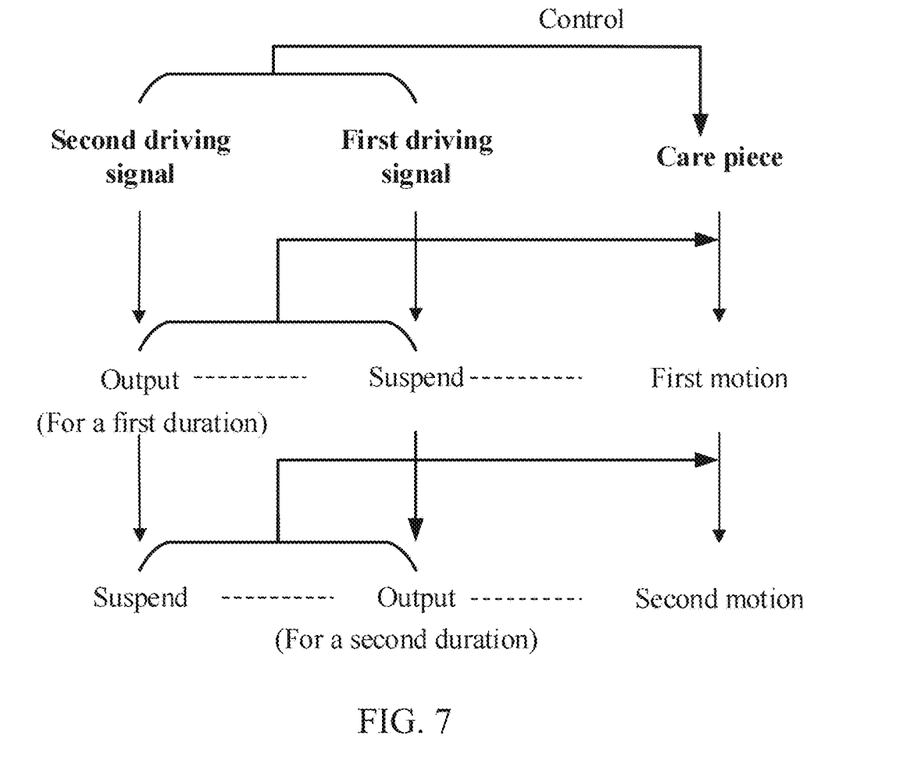
FIG. 7 is another schematic diagram of the control process of the control method of the oral care device according to one embodiment of the present disclosure.

Optionally, as shown in FIG. 7, the step S403 of alternately outputting the first driving signal and the second driving signal comprises: outputting the first driving signal for a first duration to control the care component to perform the first motion for the first duration, suspending output of the first driving signal, outputting the second driving signal for a second duration to control the care component to perform the second motion for the second duration, then suspending output of the second driving signal, and outputting the first driving signal again for the first duration again. By repeatedly performs the step S403, the care component is controlled to alternately perform the first motion and the second motion. The first duration is not less than the second duration. In this way, the care component is controlled to swing at a high frequency (first motion) for the first duration and then scrape the tooth surfaces laterally (second motion). The care component swings at the high frequency for a long time (the first motion), so plaque stripped from the tooth surfaces is accumulated in one direction. Then, the care component scrapes the tooth surfaces laterally to scrape away the plaque (the second motion), so that the oral care efficiency and oral care effect of the oral care device are improved.

Furthermore, when the first motion and the second motion alternate, both the bidirectional motor and the care component require a certain reaction time. If the first driving signal and the second driving signal alternate too fast, the bidirectional motor is unable to react, resulting in the bidirectional motor receiving a next driving signal and driving the care component to generate a next motion while the bidirectional motor not yet driving the care component to complete a current motion. As a result, the care component is unable to achieve a good effect of alternating motion, thereby affecting the oral care effect. Therefore, the first duration and second duration should be greater than a predetermined duration (the predetermined duration may be 10 ms, 1 s, etc.), so as to avoid a problem that a frequency of controlling the care component to switch between the first motion and the second motion is too high, resulting in poor actual alternating motion of the care component. Therefore, the oral care efficiency and the oral care effect of the oral care device are further improved.

Optionally, a frequency of the first driving signal is different from a frequency of the second driving signal, and/or a duty ratio of the first driving signal is different from a duty ratio of the second driving signal. Namely, a frequency of the first motion is different from a frequency of the second motion, and/or a duty ratio of the first motion is different from a duty ratio of the second motion. Thus, in an oral care process, in addition to controlling the care component to alternately move with different motion paths, the frequencies and/or the duty ratios of the driving signals are controlled, so that the care component forms different combined forces in terms of motion force or motion switching speed, which further improves the oral care effect of the oral care device. Moreover, the care component of the oral care device is allowed to combine more complex motion paths under controls of the driving signals with different frequencies and/or duty ratios, increasing a diversity of the care methods and scraping methods, and further improving the oral care effect of the oral care device.

Optionally, the first motion is a combined motion and the combine motion comprises motions in different motion directions. The second motion is a single motion. A motion path of the combined motion is a curve, which provides a better protective effect on the gum line of the user by applying forces at an angle. A motion path of the single motion is a straight line, so that by controlling the care component to alternately perform the combined motion in different motion directions and the single motion, the plaque accumulated on the gum line is removed, thereby improving the oral care effect.

Figure 8:
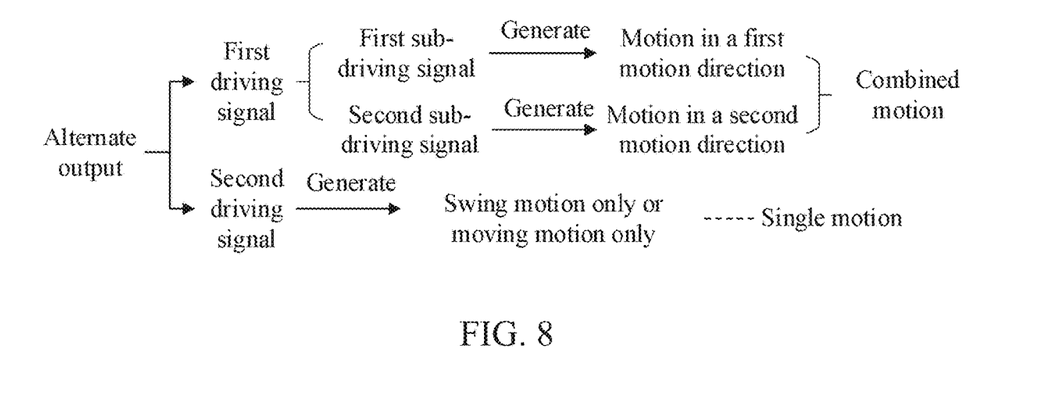
FIG. 8 is another schematic diagram of the control process of the control method of the oral care device according to one embodiment of the present disclosure.

Furthermore, the single motion only comprises a swing motion of the care component or a moving motion of the care component. As shown in FIG. 8, the first driving signal comprises a first sub-driving signal and a second sub-driving signal. The first sub-driving signal drives the care component to generate a motion in a first motion direction. The second sub-driving signal drives the care component to generate a motion in a second motion direction. The first motion direction is different from the second motion direction. The step of controlling the care component to generate the first motion based on the first driving signal comprises simultaneously controlling, based on the first sub-driving signal and the second sub-driving signal, the care component to generate the combined motion. The combined motion comprises the motion in the first motion direction and the motion in the second motion direction. The first motion direction or the second motion direction is same as a motion direction of the second motion.

In this way, by alternately outputting the first driving signal and the second driving signal, the care component alternately outputs the combined motion and the single swing, or the care component alternately outputs the combined motion and the single movement, which provides better protection for the gum line of the user while efficiently removing the plaque accumulated on the gum line, thereby improving the oral care effect.

Figure 9:
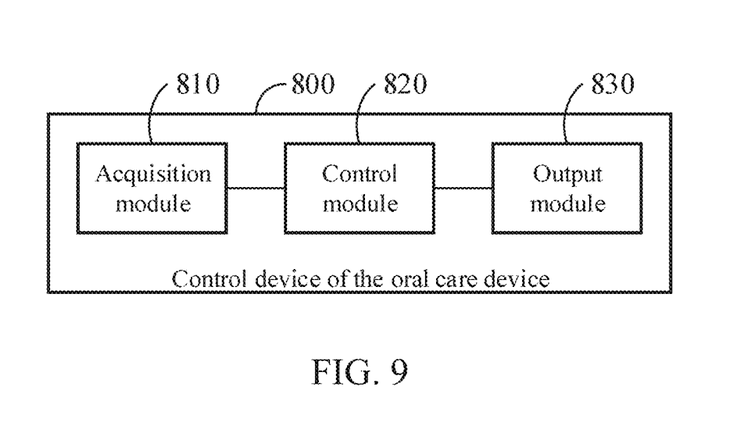
FIG. 9 is a structural schematic diagram of a control device of the oral care device according to one embodiment of the present disclosure.

FIG. 9 is a structural schematic diagram of a control device of the oral care device according to one embodiment of the present disclosure. The oral care device comprises the care component. As shown in FIG. 9, the control device 800 of the oral care device comprises an acquisition module 810, a control module 820, and an output module 830. The acquisition module 810 is configured to obtain the oral care instruction. The control module 820 is configured to determine the first driving signal and the second driving signal corresponding to the oral care instruction in response to the oral care instruction, is configured to control the care component to generate the first motion based on the first driving signal, and is configured to control the care component to generate the second motion based on the second driving signal. The motion path of the first motion is different from the motion path of the second motion. The output module 830 is configured to alternately output the first driving signal and the second driving signal to control the care component to alternately output the first motion and the second motion.

In one optional embodiment, a motion direction of the first motion is different from a motion direction of the second motion.

In one optional embodiment, the first motion comprises the reciprocating swing with the length extension direction of the care component as the swing axis, and the second motion comprises the reciprocating motion along the length extension direction of the care component.

In one optional embodiment, the movement amplitude of the second motion is greater than the swing amplitude of the first motion; and/or a movement frequency of the second motion is less than a swing frequency of the first motion.

In one optional embodiment, the output module 830 is specifically configured to output the first driving signal for the first duration, suspend output of the first driving signal, output the second driving signal for the second duration, suspend output of the second driving signal, and output the first driving signal again for the first duration. The first duration is not less than the second duration.

In one optional embodiment, the output module 830 is specifically configured to output the first driving signal for the first duration, suspend output of the first driving signal, output the second driving signal for the second duration, suspend output of the second driving signal, and output the first driving signal again for the first duration. The first duration and the second duration are greater than the predetermined duration;

In one optional embodiment, the frequency of the first driving signal is different from the frequency of the second driving signal, and/or the duty ratio of the first driving signal is different from the duty ratio of the second driving signal.

In one optional embodiment, the motion direction of the first motion is same as a motion direction of the second motion, and/or a duty ratio of the first driving signal controlling the care component to generate the first motion is different from a duty ratio of the second driving signal controlling the care component to generate the second motion.

In one optional embodiment, the first motion and the second motion are reciprocating swings with the length extension direction of the care component as the swing axis; and/or the duty ratio of the first driving signal controlling the care component to generate the first motion is less than the duty ratio of the second driving signal controlling the care component to generate the second motion.

In one optional embodiment, the duration of the first motion is greater than the duration of the second motion.

In one optional embodiment, the first motion is the combined motion, and the combine motion comprises the motions in different motion directions. The second motion is the single motion.

In one optional embodiment, the second motion comprises only a swing motion of the care component or a moving motion of the care component. The first driving signal comprises the first sub-driving signal and the second sub-driving signal. The first sub-driving signal drives the care component to generate the motion in the first motion direction. The second sub-driving signal drives the care component to generate the motion in the second motion direction. The first motion direction is different from the second motion direction, and the first motion direction or the second motion direction is same as the motion direction of the second motion.

When the control module 820 controls the care component to generate the first motion based on the first driving signal, the control module 820 is specifically configured to simultaneously control, based on the first sub-driving signal and the second sub-driving signal, the care component to generate the combined motion. The combined motion comprises the motion in the first motion direction and the motion in the second motion direction.

In one optional embodiment, the oral care device further comprises the bidirectional motor. The control module 820 is specifically configured to control the bidirectional motor, based on the first driving signal, to drive the care component to generate the first motion. The control module 820 is specifically configured to control the bidirectional motor, based on the second driving signal, to drive the care component to generate the second motion.

A division of the modules in the control device of the oral care device is only for illustration. In other embodiments, the control device of the oral care device may be divided into different modules as needed to complete all or part of the functions of the control device of the oral care device. Each of the modules of the control device of the oral care device of the embodiments of the present disclosure may be a computer program. The computer program may be run on a terminal device, a server, or the oral care device. Program modules constituted by the computer program may be stored in a memory of the terminal device, the server, or the oral care device. When the computer program is executed by the processor, all or part of the steps of the control method of the oral care device described in the embodiments of the present disclosure are implemented.

Figure 10:
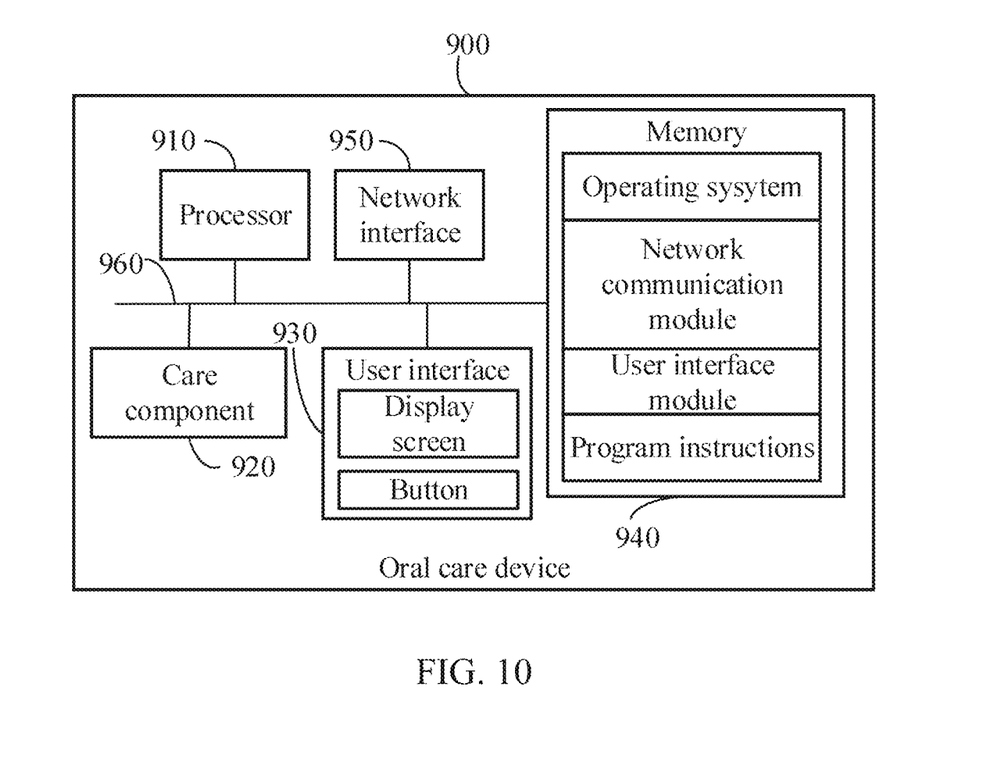
FIG. 10 is another circuit diagram of the oral care device according to one embodiment of the present disclosure.

FIG. 10 is another circuit diagram of the oral care device according to one embodiment of the present disclosure. As shown in FIG. 10, the oral care device 900 comprises at least one processor 910, a care component 920, a user interface 930, a memory 940, at least one network interface 950, and at least one communication bus 960.

The oral care device 900 may be, but is not limited to, the oral cleaning device such as the electric toothbrush or the oral irrigator.

The at least one communication bus 960 is configured to realize connection and communication between the various components of the oral care device 900, such as the at least one processor 910, the care component 920, the user interface 930, the memory 940, the at least one network interface 950, etc.

The care component 920 is configured to care for the oral cavity of the user. Exemplarily, the care component 920 may be equivalent to the care component 110.

The user interface 930 comprises a display screen and a camera. Optionally, the user interface 930 may further comprises a standard wired interface and a wireless interface.

Optionally, the at least one network interface 950 comprises a BLUETOOTH module, a near field communication (NFC) module, a wireless fidelity (Wi-Fi) module, etc.

The at least one processor 910 comprises one or more processing cores. The at least one processor 910 uses various interfaces and lines to connect various parts of the oral care device 900. The processor 910 executes various functions and processes data of the oral care device 900 by running or executing instructions, programs, code sets or instruction sets stored in the memory 940, and calling data stored in the memory 940. Optionally, the at least one processor 910 is implemented by at least one hardware of a digital signal processing (DSP), a field programmable gate array (FPGA), and a programmable logic array (PLA). The at least one processor 910 may integrate one or a combination of a central processing unit (CPU), a graphics processing unit (GPU), and a modem. The CPU mainly processes an operating system and an application for the oral care device 900. The GPU is responsible for rendering and drawing content to be displayed on the display screen. The modem is configured to process wireless communications. It is understood that the modem may not be integrated into the at least one processor 910, but implemented by a chip.

Specifically, the at least one processor 910 may be equivalent to the control unit 120.

The memory 940 may be a random access memory (RAM) or a read-only memory (ROM). Optionally, the memory 940 may be a non-transitory computer-readable medium.

The memory 940 is configured to store the instructions, the programs, the codes, the code sets or the instruction sets. The memory 940 comprises a program storage area and a data storage area. The program storage area stores the instructions for implementing the operating system, the instructions for at least one function (such as a receiving function, a control function, a determination function, etc.), the instructions for implementing the controls method of the present disclosure, etc. The data storage area stores data involved in the control method of the present disclosure, etc. Optionally, the memory 940 may be at least one storage device located away from the at least one processor 910. As shown in FIG. 10, the memory 940 served as a computer storage medium may comprises the operating system, a network communication module, a user interface module, and program instructions.

In one optional embodiment, in the oral care device shown in FIG. 10, the at least one processor 910 is configured to call the program instructions stored in the memory 940. Further, the at least one processor 910 is configured to obtain an oral care instruction, determines a first driving signal and a second driving signal in response to the oral care instruction, controls a care component to generate a first motion based on the first driving signal, and controls the care component to generate a second motion based on the second driving signal. A motion path of the first motion is different from a motion path of the second motion. The at least one processor 910 is configured to alternately output the first driving signal and the second driving signal to control the care component to alternately output the first motion and the second motion.

In one optional embodiment, a motion direction of the first motion is different from a motion direction of the second motion.

In one optional embodiment, the first motion comprises reciprocating swing with a length extension direction of the care component as a swing axis, and the second motion comprises reciprocating motion along the length extension direction of the care component.

In one optional embodiment, a movement amplitude of the second motion is greater than a swing amplitude of the first motion; and/or a movement frequency of the second motion is less than a swing frequency of the first motion.

In one optional embodiment, when the at least one process 910 alternately outputs the first driving signal and the second driving signal, the at least one processor 910 is specifically configured to output the first driving signal for the first duration, suspend output of the first driving signal, output the second driving signal for the second duration, suspend output of the second driving signal, and output the first driving signal again for the first duration. The first duration is not less than the second duration.

In one optional embodiment, when the at least one process 910 alternately outputs the first driving signal and the second driving signal, the at least one processor 910 is specifically configured to output the first driving signal for the first duration, suspend output of the first driving signal, output the second driving signal for the second duration, suspend output of the second driving signal, and output the first driving signal again for the first duration. The first duration and the second duration are greater than the predetermined duration;

In one optional embodiment, a frequency of the first driving signal is different from a frequency of the second driving signal, and/or a duty ratio of the first driving signal is different from a duty ratio of the second driving signal.

In one optional embodiment, a motion direction of the first motion is same as a motion direction of the second motion, and/or a duty ratio of the first driving signal controlling the care component to generate the first motion is different from a duty ratio of the second driving signal controlling the care component to generate the second motion.

In one optional embodiment, the first motion and the second motion are reciprocating swings with the length extension direction of the care component as the swing axis; an amplitude of the first motion is less than an amplitude of the second motion, and/or the duty ratio of the first driving signal controlling the care component to generate the first motion is less than the duty ratio of the second driving signal controlling the care component to generate the second motion.

In one optional embodiment, a duration of the first motion is greater than a duration of the second motion.

In one optional embodiment, the first motion is a combined motion, and the combine motion comprises motions in different motion directions. The second motion is a single motion.

In one optional embodiment, the second motion only comprises a swing motion of the care component or a moving motion of the care component. The first driving signal comprises a first sub-driving signal and a second sub-driving signal. The first sub-driving signal drives the care component to generate a motion in a first motion direction. The second sub-driving signal drives the care component to generate a motion in a second motion direction. The first motion direction is different from the second motion direction, and the first motion direction or the second motion direction is same as the motion direction of the second motion.

When the at least one processor 910 controls the care component to generate the first motion based on the first driving signal, the at least one processor 910 is specifically configured to simultaneously control, based on the first sub-driving signal and the second sub-driving signal, the care component to generate the combined motion. The combined motion comprises the motion in the first motion direction and the motion in the second motion direction.

In one optional embodiment, the oral care device further comprises a bidirectional motor. The bidirectional motor may be referred to the bidirectional motor 130, which is not repeatedly illustrated herein. When the at least one processor 910 controls the care component to generate the first motion based on the first driving signal and controls the care component to generate the second motion based on the second driving signal, the at least one processor 910 is specifically configured to control the bidirectional motor, based on the first driving signal, to drive the care component to generate the first motion. The control module 820 is specifically configured to control the bidirectional motor, based on the second driving signal, to drive the care component to generate the second motion.

The embodiments of the present disclosure further provides a computer storage medium, and the instructions are stored in the computer storage medium. When the instructions are executed on a computer or the at least one processor, the computer or the at least one processor executes one or more steps of the control method in any of the embodiments. When component modules of the control device of the oral care device are implemented in a form of software functional units and are sold or used as an independent product, the component modules are stored in the computer storage medium.

In the above embodiments, the present disclosure may be implemented in whole or in part by software, hardware, firmware or any combination thereof. When implemented by software, the software is implemented in whole or in part of a form of a computer program product. The computer program product includes one or more computer instructions. When the one or more computer program instructions are loaded and executed on the computer, the process or function described in the embodiments of the present disclosure is generated in whole or in part. The computer may be a general-purpose computer, a special-purpose computer, a computer network, or other programmable device. The one or more computer instructions may be stored in the computer-readable storage medium or transmitted through the computer-readable storage medium. The one or more computer instructions may be transmitted from a website site, a computer, a server, or a data center to another website site, another computer, another server or another data center by wired (e.g., coaxial cable, optical fiber, digital subscriber line) or wireless (e.g., infrared, wireless, microwave, etc.) mode. The computer-readable storage medium may be any available medium that is able to be accessed by the computer or a data storage device such as the server or the data center that includes one or more available media integrated. The one or more available media may be a magnetic medium (e.g., a floppy disk, a hard disk, a magnetic tape), an optical medium (e.g., a digital versatile disc (DVD)), or a semiconductor medium (e.g., a solid state disk (SSD)).

Those skilled in the art can understand that all or part of the processes in the above-mentioned embodiments can be implemented by instructing the relevant hardware through the computer programs, and the computer programs may be stored in the computer-readable storage medium. When the computer programs are executed, the processes of the embodiments of the present disclosure are executed. The storage medium comprises the ROM, the RAM, a magnetic disk, an optical disk, or other media that are able to store the program codes. In the absence of conflict, the technical features in the embodiments and implementation schemes of the present disclosure can be combined arbitrarily.

What is claimed is:

1. A control method of an oral care device, comprising steps:

obtaining an oral care instruction;

determining a first driving signal and a second driving signal corresponding to the oral care instruction in response to the oral care instruction, controlling a care component to generate a first motion based on the first driving signal, and controlling the care component to generate a second motion based on the second driving signal, wherein a motion path of the first motion is different from a motion path of the second motion; and alternately outputting the first driving signal and the second driving signal to control the care component to alternately output the first motion and the second motion;

wherein the step of alternately outputting the first driving signal and the second driving signal comprises:

outputting the first driving signal for a first duration;

suspending output of the first driving signal, and outputting the second driving signal for a second duration; and suspending output of the second driving signal, and outputting the first driving signal again for the first duration;

wherein the first duration is not less than the second duration, and/or the first duration and the second duration are greater than a predetermined duration;

wherein the oral care device comprises a bidirectional motor and the care component, the control method is applied to the bidirectional motor, and the bidirectional motor drives the care component to move.

2. The control method according to claim 1, wherein a motion direction of the first motion is different from a motion direction of the second motion.

3. The control method according to claim 2, wherein the first motion comprises a reciprocating swing with a length extension direction of the care component as a swing axis, and the second motion comprises a reciprocating motion along the length extension direction of the care component.

4. The control method according to claim 3, wherein a movement amplitude of the second motion is greater than a swing amplitude of the first motion; and/or a movement frequency of the second motion is less than a swing frequency of the first motion.

5. The control method according to claim 1, wherein a frequency of the first driving signal is different from a frequency of the second driving signal, and/or a duty ratio of the first driving signal is different from a duty ratio of the second driving signal.

6. The control method according to claim 1, wherein a motion direction of the first motion is same as a motion direction of the second motion, and/or a duty ratio of the first driving signal is different from a duty ratio of the second driving signal.

7. The control method according to claim 6, wherein the first motion and the second motion are reciprocating swings with a length extension direction of the care component as a swing axis; and the duty ratio of the first driving signal is less than the duty ratio of the second driving signal.

8. The control method according to claim 7, wherein a duration of the first motion is greater than a duration of the second motion.

9. The control method according to claim 1, wherein the first motion is a combined motion, the combine motion comprises motions in different motion directions, and the second motion is a single motion.

10. The control method according to claim 9, wherein the second motion only comprises a swing motion of the care component or a moving motion of the care component;
wherein the first driving signal comprises a first sub-driving signal and a second sub-driving signal, the first sub-driving signal drives the care component to generate a motion in a first motion direction, the second sub-driving signal drives the care component to generate a motion in a second motion direction, the first motion direction is different from the second motion direction, and the first motion direction or the second motion direction is same as a motion direction of the second motion;
wherein the step of controlling the care component to generate the first motion based on the first driving signal comprises a step:
simultaneously controlling, based on the first sub-driving signal and the second sub-driving signal, the care component to generate the combined motion;
wherein the combined motion comprises the motion in the first motion direction and the motion in the second motion direction.

11. The control method according to claim 1, wherein the bidirectional motor comprises a first driving mechanism and a second driving mechanism, and the first driving mechanism and the second driving mechanism are connected to the care component;
wherein the first driving mechanism is configured to drive the care component to generate the first motion based on the first driving signal, and the second driving mechanism is configured to drive the care component to generate the second motion based on the second driving signal.

12. The control method according to claim 11, wherein the first driving mechanism and the second driving mechanism work alternately to drive the care component to alternately generate the first motion and the second motion.

13. The control method according to claim 11, wherein the first driving mechanism and the second driving mechanism work simultaneously to drive the care component to generate a combined motion, and then the first driving mechanism or the second driving mechanism drives the care component to generate a single motion, so as to from an alternating action of the combined motion and the single motion.

14. The control method according to claim 11, wherein the first driving mechanism is configured to drive, based on the first driving signal, the care component to swing in a reciprocating manner with a length extension direction of the care component as a swing axis;
wherein the second driving mechanism is configured to drive, based on the second driving signal, the care component to reciprocate in the length extension direction of the care component.

15. An oral care device, comprising:
a memory; and
a processor;
wherein the memory is connected to the processor, and the memory is configured to store executable program code;
wherein the processor runs a program corresponding to the executable program code by reading the executable program code stored in the memory, so as to execute the control method according to claim 1.

* * * * *